Dec. 14, 1926.
H. G. ALEXANDER
1,610,914
PICKER CYLINDER
Filed July 2, 1926
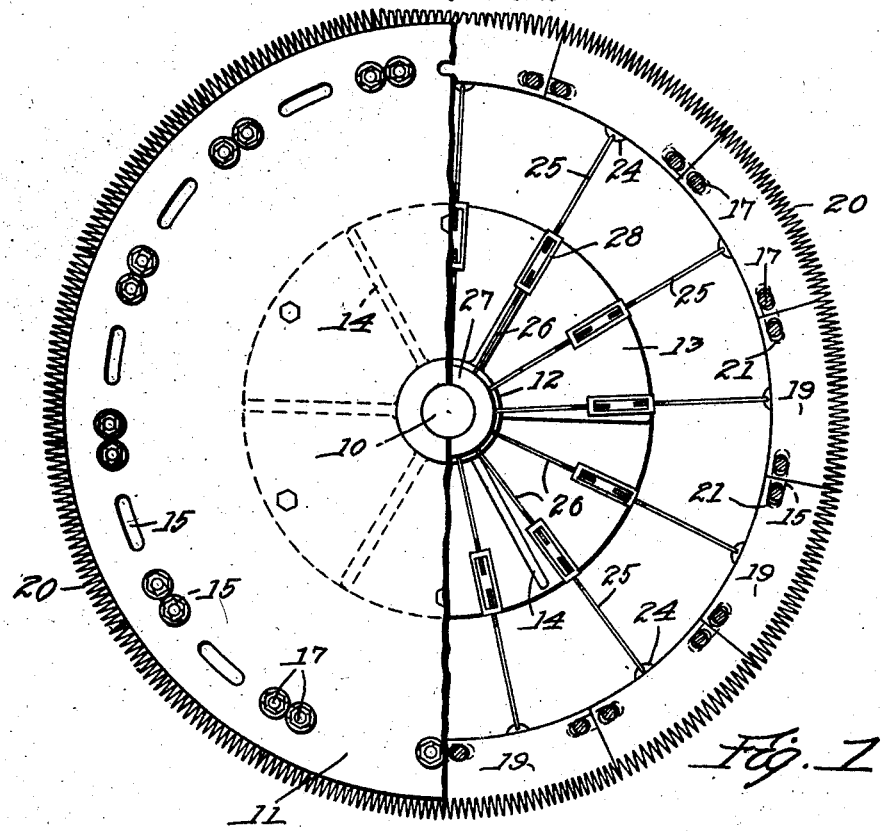
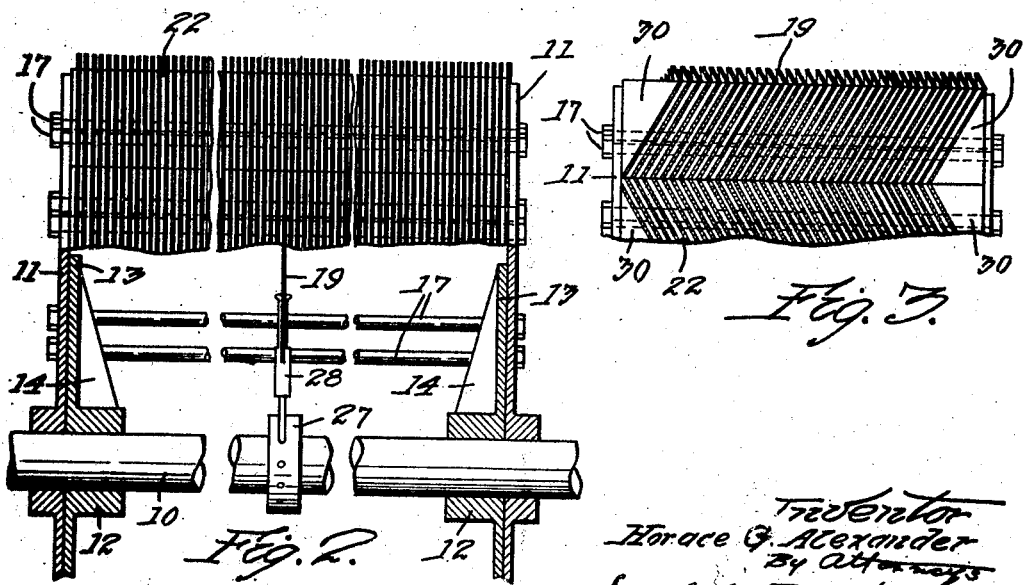

Patented Dec. 14, 1926.

1,610,914

UNITED STATES PATENT OFFICE.

HORACE G. ALEXANDER, OF SOUTH LONDONDERRY, VERMONT.

PICKER CYLINDER.

Application filed July 2, 1926. Serial No. 120,211.

This invention relates to a picker cylinder designed for the same purpose as my previous cylinders shown in my Patents No. 1,529,826, issued March 17, 1925 and No. 1,583,823, issued May 11, 1926.

This invention involves the securing of most of the advantages set forth in my patents, particularly the later one and also provides for mounting a larger number of points on the cylinder than has been done in either of said patents.

It involves changes in the location of the blades and means for holding them against distortion by centrifugal force.

Other objects and advantages of the invention will appear hereinafter.

Reference is to be had to the accompanying drawings in which—

Fig. 1 is an end view of a picker cylinder constructed in accordance with this invention, cut away along a diameter through the end plate to show interior construction;

Fig. 2 is a central sectional view of the same partly in elevation; and

Fig. 3 is a similar fragmentary view showing a modification.

For use on fine goods, it is desirable that a picker cylinder have as many teeth or points as possible. According to the second of my above mentioned patents a large number of points were mounted on the cylinder without the necessity of drilling and without weakening the walls of the cylinder. The same advantage is secured here, but with the present construction a still larger number of points can be provided, the separate lags can be removed independently, and means is provided for preventing the center of the lag from moving outwardly from the influence of centrifugal force and distorting the surface of the cylinder.

In this construction, the shaft 10 is provided with a pair of end discs 11 and also hubs 12, each having a strengthening disc 13 with spaced ribs 14 around it connected with the end 11 of the cylinder. These end discs 11 are circular and provided with concentric slots 15 through each of which two rods 17 are adapted to pass from one disc 11 to the other. These rods are secured by nuts or other means and they also pass through a series of knives or blades 19 which are arcuate in form and provided with teeth 20 on their outer edges.

Near the opposite edges of each of these blades are elongated slots 21. The rods 17 pass through these slots and permit the plates to be adjusted slightly and yet hold them firmly together. Of course, it will be understood that between the plates there are fillers or spacers 22. On account of the fact that the slots 21 are elongated it is easy to adjust these knives individually or a whole lag collectively.

It will be seen that these knives extend circumferentially and that the series of them extend around the whole circumference of the cylinder. Although the slots 21 are elongated the rods hold them firmly together against their spacers and between the end discs 11, so that after once being tightened up it constitutes a rigid and uniform cylinder.

On account of the fact of centrifugal force, I provide one or more of the blades 17 with a projecting lug 24 having a perforation for receiving a hook 25 which is connected with another hook 26 secured in a perforation in a hub 27 on the shaft 10. These two hooks are arranged radially and each pair is connected by a turn buckle 28 so as to hold in the whole lag and prevent its moving outwardly. Although shown as applied to only one knife or blade it will be obvious that it holds them all as the rods 19 have no play radially with respect to these blades. It is really the rods that are held back by this turn buckle arrangement.

In Fig. 3 the same blades 19 are used, but they are arranged angularly instead of exactly circumferentially. They are also alternated to furnish the so-called herringbone appearance. The reason for this construction is that the points of the blades do not come directly behind each other in the picking operation. In this case there is a triangular block 30 at each end instead of a series of blades at that point.

By this construction it will be seen that a very large number of points can be provided, thus duplicating the finest cylinder on the market and that the expense is comparatively small. The cylinder is very durable and the knives will not become loose. Furthermore the center of the cylinder cannot expand under centrifugal force. The limitations now placed on the number and fineness of the points are largely eliminated by this invention.

Although I have illustrated and described only two forms of the invention, I am aware of the fact that other modifications can be made therein by any person skilled in the art without departing from the scope of the invention as expressed in the claims. Therefore I do not wish to be limited to all the details herein shown and described, but what I do claim is:—

1. As an article of manufacture, a picker cylinder, comprising a pair of end plates having a series of slots therein, a series of sets of knives having points integrally located thereon, said knives having a curved formation and arranged circumferentially, each knife having a slot at each end, and pairs of rods extending through the slots in the end plates and the slots in two adjacent knives to secure the knives in position to form a cylinder.

2. As an article of manufacture, a picker cylinder, comprising a pair of flat circular end plates, each having a series of short slots arranged in a circle therearound, a series of lags arranged around the cylinder, each formed of a series of circumferential curved blades with points on their outer edges and arranged in series across the cylinder, each of said blades having an elongated slot at each end, and pairs of rods extending through the slots in the end plates and each one located in slots in adjacent sets of knives, whereby the knives can be adjusted circumferentially and then secured in position by securing the rods to the end plates.

3. In a picker cylinder, the combination with a shaft and a pair of end plates thereon constituting the limits of the cylinder, of a series of lags, consisting of knives having points thereon, each extending throughout the length between the plates, the knives being arranged parallel with each other from one plate to the other and having spacers between them, means for holding the knives in position in sets or lags, and adjustable rods for tying certain of said knives to the shaft at a point between the end plates for preventing distortion of the cylinder.

In testimony whereof I have hereunto affixed my signature.

HORACE G. ALEXANDER.